Figure 1:
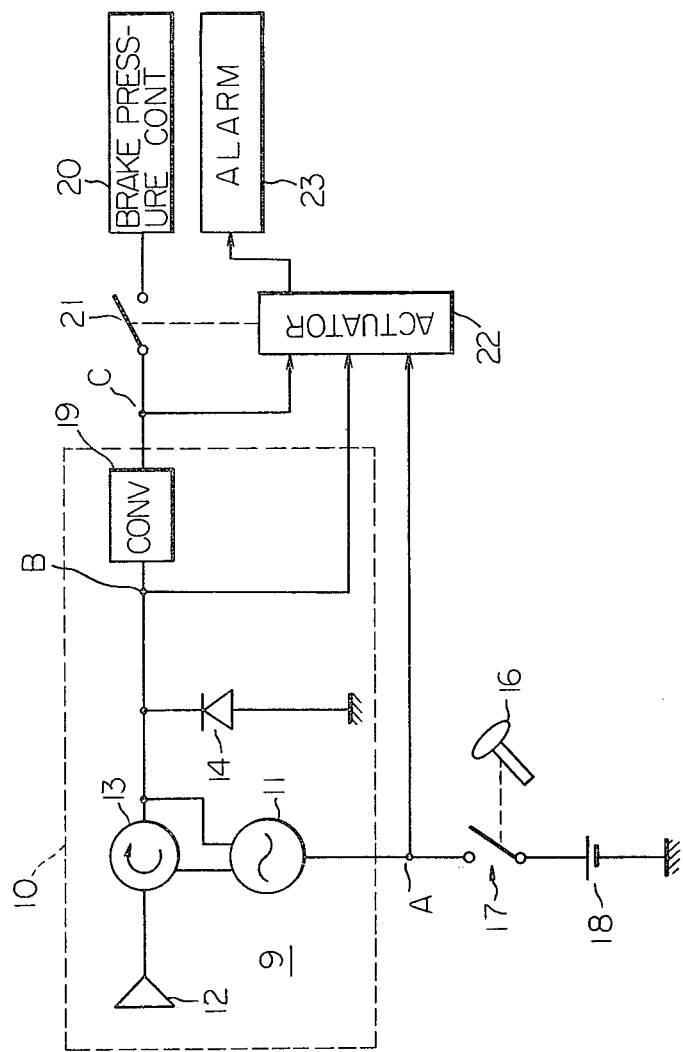

United States Patent [19]
Fukumori

[11] 3,889,259
[45] June 10, 1975

[54] VEHICLE SPEED SENSOR FOR SKID CONTROL SYSTEM

[75] Inventor: Yukitsugu Fukumori, Yokohama, Japan

[73] Assignee: Nissan Motor Company Limited, Yokohama, Japan

[22] Filed: Jan. 21, 1974

[21] Appl. No.: 435,014

[30] Foreign Application Priority Data
Jan. 22, 1973  Japan.................................. 48-8564

[52] U.S. Cl...................... 343/7 ED; 343/8; 180/98
[51] Int. Cl............................. G01s 9/44; B60t 7/00
[58] Field of Search................. 343/7 ED, 8; 180/98

[56] References Cited
UNITED STATES PATENTS

| | | | |
|---|---|---|---|
| 3,701,568 | 10/1972 | Lewis et al. .................. | 343/7 ED X |
| 3,772,698 | 11/1973 | Furia ........................... | 343/7 ED X |
| 3,820,622 | 6/1974 | Powell......................... | 343/7 ED X |

Primary Examiner—T. H. Tubbesing

[57] ABSTRACT

A doppler radar is utilized to measure actual vehicle speed, and is energized only when the vehicle brake pedal is depressed. The output of the radar is fed to the skid control system only if an internal checking circuit determines that the radar is operating properly.

7 Claims, 2 Drawing Figures

VEHICLE SPEED SENSOR FOR SKID CONTROL SYSTEM

The present invention relates in general to vehicle speed detectors for skid control systems for wheeled vehicles and in particular is concerned with a vehicle speed sensor for a skid control system utilizing a doppler radar system.

As is well known in the art, a skid control system is installed in a wheeled vehicle in order to achieve the shortest brake path for emergency braking operation. Various skid control systems have been developed, some of which modulate the brake cylinder pressure in accordance with the slippage of the wheels (slippage control system). Other systems are arranged to modulate the brake cylinder pressure in accordance with the deceleration of the wheels (deceleration control system). In both types of skid control systems, it is necessary to provide a vehicle speed signal representing the actual speed of the wheeled vehicle.

A vehicle speed sensor utilizing a doppler radar is very desirable for such skid control systems because it can measure the exact vehicle speed even during a skid condition of the vehicle.

It is, however, a problem in that a doppler radar system inherently dissipates a large amount of electrical energy. It is another problem that when a number of vehicles utilizing doppler radars come near one another, interference between electromagnetic waves emitted from the radar systems takes place, or in some cases, the waves adversely affect telecommunication systems near the road. It is still another problem that a doppler radar system is subject to unwanted influence by external noises since it is arranged to pick up an echo signal which is usually weak. Since, furthermore, a radar system used for this purpose is constructed from microwave circuit elements which are susceptible to surge voltages caused by external noises, the overall skid control system is subject to influence from external noises.

It is accordingly a principal object of the present invention to provide a new and improved vehicle speed sensor for a skid control system utilizing a doppler radar system, which does not consume a large amount of electrical energy.

It is another object of the present invention to provide a new and improved vehicle speed sensor utilizing a doppler radar system for a skid control system, which can reduce the possibility of interference with other vehicle sensors using doppler radar systems even when these vehicle speed detectors are close to one another.

It is a further object of the present invention to provide a new and improved vehicle speed sensor utilizing a doppler radar system for a skid control system, which can reduce the possibility of influence of the radar waves on telecommunication systems near the road.

It is a still further object of the present invention to provide a new and improved vehicle speed sensor utilizing a doppler radar system for a skid control system, which can detect a malfunction therewithin and prevent erroneous operation of the skid control system.

Figure 2:
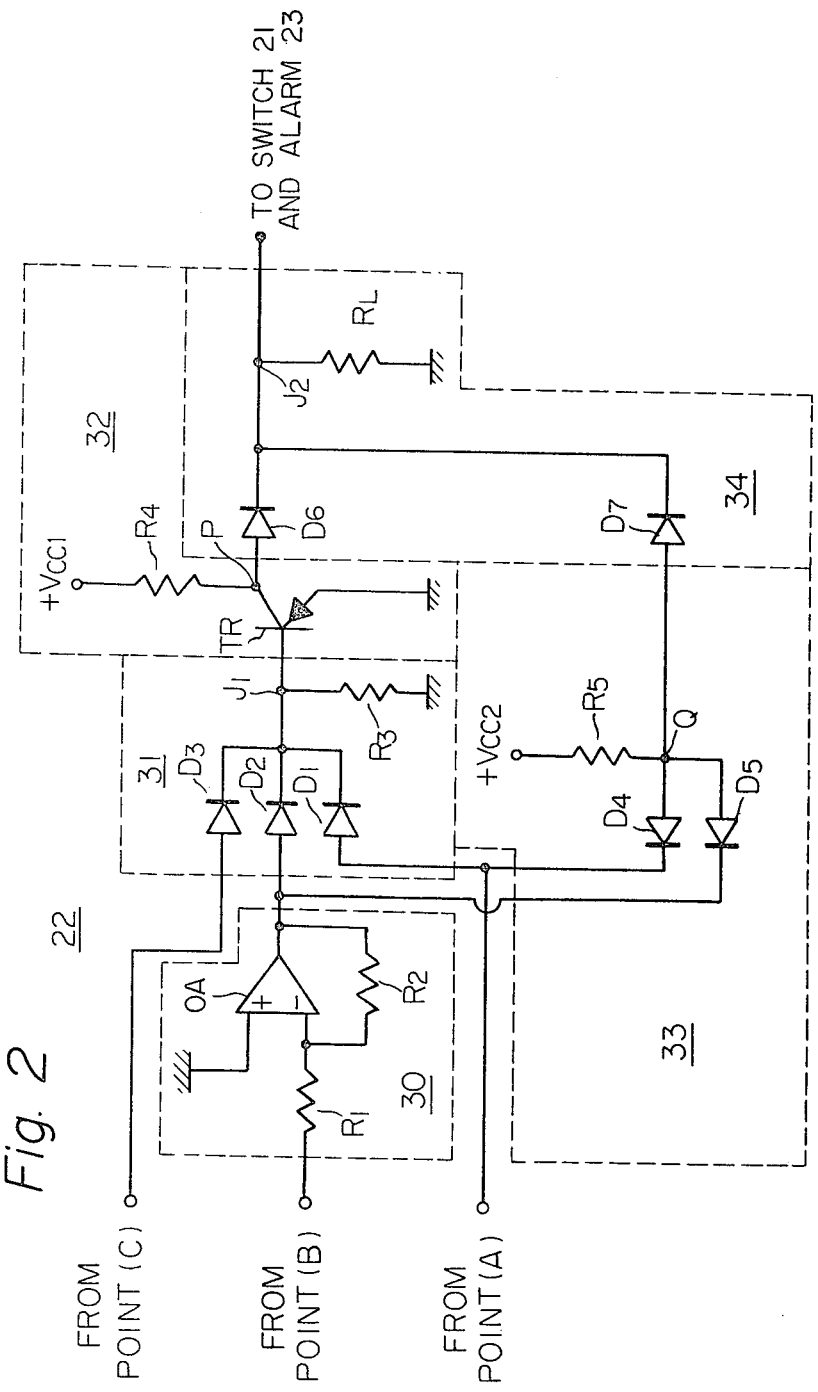

The above and other objects, features and advantages of the invention will become clear from the following description and attached drawings, in which;

FIG. 1 is a schematic block diagram of an embodiment of a vehicle speed sensor according to the present invention; and FIG. 2 is a schematic diagram illustrating a circuit arrangement constituting a part of the vehicle speed sensor of FIG. 1.

Referring now to the drawings and more specifically to FIG. 1, there is shown a preferred embodiment of a vehicle speed sensor according to the present invention, which comprises a doppler radar system 10. Although various types of doppler radar systems may be used, the radar system 10 includes, in this embodiment, a doppler radar 9 having a signal generator 11 for generating a radar signal, a transmitting and receiving antenna 12 for emitting the radar signal and receiving echo signals from the raod surface, a circulator 13 for passing therethrough the radar signal from the radar signal generator 11 to the antenna 12 and the echo signal from the antenna 12, and a mixer 14 for mixing the echo signal passed through the circulator 13 and the original radar signal to produce a doppler signal at an output junction B of the doppler radar 9. The doppler signal has a doppler frequency analogous to the speed of the vehicle. The radar signal generator 11 is arranged to produce the radar signal only when it is connected to an electrical power source 18 through an input junction A and a first switch 17. The switch 17 is normally open and is connected through a suitable linkage to a brake pedal 16 of the vehicle, and closes when the operator of the vehicle depresses the brake pedal 16 to apply braking force to the wheels. The output junction B of the doppler radar 9 is connected to an input of a converter 19 constituting part of the doppler radar system 10 for converting the doppler signal into an electrical speed signal having a voltage proportional to the frequency of the doppler signal and analogous to the vehicle speed. The speed signal can be fed to a brake cylinder pressure controler 20 of a skid control system (not shown).

The vehicle speed sensor preferably further includes switch means comprising a second switch 21 connected by way of a junction C to an output of the converter 19, for passing therethrough the speed signal from the converter 19 to the brake pressure controler 20 when it is actuated by an actuator 22. The actuator 22 has first, second and third inputs (no numerals) connected to the junctions A, B and C respectively, at which signals constituting operating parameters of the doppler radar system 10 appear. The actuator 22 closes the switch 21 only when the values of the operating parameters correspond to a predetermined pattern indicating normal operation of the doppler radar system 10. An alarm 23 may be provided, which is actuated by the actuator 22 when the vehicle speed sensor malfunctions.

When, in operation, the brake pedal 16 of the vehicle is not depressed, the switch 17 is open, and the doppler radar system 10 is inoperative. In this case, the potentials at the junctions A, B and C are all zero (0) if the vehicle speed sensor is normal. When, therefore, the potentials at the junctions B and/or C are not zero even though the potential at the junction A is zero, the vehicle speed sensor is malfunctioning. In this case, the actuator 22 does not close the switch 21, but actuates the alarm circuit 23.

When the brake pedal 16 of the vehicle is depressed, the switch 17 is closed, and the doppler radar system 10 is energized. If the vehicle speed sensor is normal, the potentials at the points A and B will not be zero, but the potential at the point C will be zero if the vehicle is stopped. Accordingly, the vehicle speed sensor is malfunctioning if the potential at the point B is zero but the potential at the point A is not zero. Thus, the actuator 22 produces the following output signals in response to the following predetermined pattern of input signals.

Table

| OUTPUT OF ACTUATOR 22 | POTENTIAL AT JUNCTION A | POTENTIAL AT JUNCTION B | POTENTIAL AT JUNCTION C |
|---|---|---|---|
| 1 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 1 | 1 | 1 | 0 |
| 1 | 1 | 1 | 1 |

In the above table, the three numerals "1" in leftmost column represent conditions in which the actuator 22 closes the switch 21 but does not actuate the alarm 23. The five numerals "0" represent conditions in which the actuator 22 opens the switch 21 and actuates the alarm 23. Each of the numerals "1" in remaining columns means that the potential at the corresponding junction is not zero, and each of the numerals "0" in the remaining columns means that the potential at the corresponding junction is zero. Thus, a numeral "1" in the left most column means that the vehicle speed sensor is normal, and a numeral "0" in this column means that the vehicle speed sensor is malfunctioning. Further, it is to be understood that the converter 19 is malfunctioning if the potential at the junction B is "0" and the potential at the junction C is "1". Furthermore, the doppler radar system 10 is malfunctioning if the potential at the junction A is "1" and the potential at the junction B is "0".

In FIG. 2, there is illustrated a preferred circuit arrangement of the actuator 22 of the vehicle speed sensor shown in FIG. 1. The circuit arrangement generally includes a d-c amplifier 30 for amplifying only the d-c component of the doppler signal appearing at the junction B, a first OR gate 31, an inverter 32, an AND gate 33, and a second OR gate 34. The d-c amplifier 30 includes an operational amplifier OA having its direct input grounded, a resistor $R_1$ having one terminal connected to the inverting input of the operational amplifier OA and the other terminal connected to the junction B, and a resistor $R_2$ shunting the inverting input to the output of the operational amplifier OA. The OR gate 31 has three inputs, the first of which is connected to the junction A. The second and third inputs are respectively connected to the junction B through the d-c amplifier 30 and the junction C. The OR gate 31 is composed of three diodes $D_1$, $D_2$ and $D_3$ having their anodes respectively connected to the first, second and third inputs respectively of the OR gate 31, and their cathodes connected by way of a junction $J_1$ to one end of a resistor $R_3$, the other end of which is grounded. An output of the OR gate 31 is connected to the junction $J_1$ and to an input of the inverter 32, which includes a transistor TR having its base connected to the input of the inverter 32 and its emitter grounded. The collector of the transistor TR is connected by way of a junction P to one end of a resistor $R_4$, the other end of which is connected to a positive terminal $V_{cc1}$ of the source 18. The AND gate 33 has two inputs respectively connected to the first and second inputs of the OR gate 31. The AND gate 33 is constituted by a pair of diodes $D_4$ and $D_5$, having their cathodes respectively connected to the inputs of the AND gate 33 and their anodes connected by way of a junction Q to one end of a resistor $R_5$, the other end of which is connected to a positive terminal $V_{cc2}$ of the source 18. The AND gate 33 has its output connected to the junction Q. The OR gate 34 has two inputs respectively connected to the outputs of the inverter 32 and the AND gate 33. The OR gate 34 is composed of a pair of diodes $D_6$ and $D_7$ having their anodes respectively connected to the inputs of the OR gate 34 and their cathodes connected by way of a junction $J_2$ to one end of a resistor $R_L$, the other end of which is grounded. The OR gate 34 has its output terminal at the junction $J_2$.

When, in operation, the voltages at the junctions A, B and C are all zero ("0"), the diodes $D_1$, $D_2$ and $D_3$ of the OR gate 31 are all OFF, so that the transistor TR of the inverter 32 is non-conductive. Thus, current flows from the power source terminal $V_{cc1}$ through the resistor $R_4$, the diode $D_6$ and the resistor $R_L$ to ground thereby causing a high voltage, or a logic "1" signal to appear at the junction $J_2$. When the voltages at the junctions A and B are both not zero ("1"), the diodes $D_4$ and $D_5$ of the AND gate 33 are non-conductive, and current flows from the power source terminal $V_{cc2}$ through the resistor $R_5$, the diode $D_7$ and the resistor $R_L$ to ground, whereby a high voltage or a logic "1" signal appears at the junction $J_2$. The OR gate 34 produces a logic "1" signal without respect to the voltage at the point C when the voltages at the junctions A and B are both "1". In cases other than the above-mentioned, both of the diodes $D_6$ and $D_7$ are non-conductive, and the OR gate 34 produces a logic "0" signal. As is apparent from the above description, the circuit arrangement of FIG. 2 produces the predetermined pattern shown in the above table.

It should be now appreciated that a vehicle speed sensor according to the present invention dissipates a reduced amount of electrical energy since the doppler radar system utilized in the vehicle speed sensor is operated only during braking. It is furthermore to be noted that since a vehicle speed sensor according to the invention does not produce an output signal if it malfunctions, erroneous operation of the skid control system due to an incorrect output signal from the vehicle speed sensor is prevented.

What is claimed is:

1. A vehicle speed sensor for a skid control system for a wheeled vehicle having a source of electrical power and a brake pedal, comprising;
   a doppler radar system operatively mounted on the vehicle to produce an electrical speed signal having a voltage analogous to the speed of the vehicle when connected to the source; and
   a first switch operative to connect said doppler radar system to the source when the brake pedal is depressed.

2. A vehicle speed sensor as claimed in claim 1, further comprising switch means responsive to a plurality of operating parameters of said doppler radar system and operative to pass said speed signal therethrough to the skid control system only if the values of said purality of operating parameters correspond to a predetermined pattern indicating normal operation of said doppler radar system.

3. A vehicle speed sensor as claimed in claim 2, in which said switch means comprises an actuator responsive to said plurality of operating parameters and a second switch controlled thereby.

4. A vehicle speed sensor as claimed in claim 3, in which said doppler radar system comprises a doppler radar operative to produce an electrical doppler signal having a frequency analogous to the speed of the vehicle, and a converter to convert said doppler signal to said speed signal.

5. A vehicle speed sensor as claimed in claim 4, in which said actuator has a first input connected to a junction between said first switch and said doppler radar system, a second input connected to a junction between said doppler radar and said converter, and a third input connected to the output of said converter; signals at said first, second and third inputs thus constituting said operating parameters of said doppler radar system and said actuator being operative to actuate said second switch in response to said predetermined pattern thereof.

6. A vehicle speed sensor as claimed in claim 5, in which said actuator comprises a first OR gate having inputs thereof connected respectively to said first, second and third inputs, an AND gate having inputs connected respectively to said first and second inputs, an inverter having an input connected to the output of said first OR gate, and a second OR gate having inputs connected to the outputs of said AND gate and said inverter.

7. A vehicle speed sensor as claimed in claim 3, further comprising an alarm which is energized when said first switch is closed and said second switch is open.

* * * * *